United States Patent
Robinson et al.

(10) Patent No.: US 7,194,579 B2
(45) Date of Patent: Mar. 20, 2007

(54) SPARSE MULTI-COMPONENT FILES

(75) Inventors: David Robinson, Austin, TX (US);
Brian L. Wong, Gordonsville, VA (US); Spencer Shepler, Austin, TX (US); Richard J. McDougall, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 421 days.

(21) Appl. No.: 10/831,936

(22) Filed: Apr. 26, 2004

(65) Prior Publication Data

US 2005/0240725 A1   Oct. 27, 2005

(51) Int. Cl.
*G06F 12/00* (2006.01)

(52) U.S. Cl. ..................................... 711/114

(58) Field of Classification Search ............... None
See application file for complete search history.

(56) References Cited

U.S. PATENT DOCUMENTS

| | | | |
|---|---|---|---|
| 5,960,169 A | 9/1999 | Styczinski | |
| 6,052,759 A | 4/2000 | Stallmo et al. | |
| 2004/0268068 A1 * | 12/2004 | Curran et al. | 711/162 |

OTHER PUBLICATIONS

PCT International Search Report for PCT Application No. PCT/US2005/010355, mailed Apr. 10, 2006 (3 pages).
PCT Written Opinion of the International Searching Authority for PCT Application No. PCT/US2005/101355, mailed Apr. 10, 2006 (5 pages).

* cited by examiner

*Primary Examiner*—Reginald Bragdon
*Assistant Examiner*—Horace L. Flournoy
(74) *Attorney, Agent, or Firm*—Park, Vaughan & Fleming LLP

(57) ABSTRACT

A file is striped across multiple filers, file servers or other devices, to create a sparsely striped multi-component file. Each filer stores one sparse component. In particular, each component physically stores only those stripes allocated to that component. The other stripes are represented as holes. Thus, instead of contiguously packing each component's stripes at the block level, each component is a file having the same logical structure. A component of a sparsely striped multi-component file can be easily converted to a mirror by filling in its holes. Similarly, a mirror can be easily converted to one component of a sparsely striped multi-component file by removing or ignoring it unallocated stripes. In either case, the layout or logical of the component does not need to be reconfigured.

18 Claims, 4 Drawing Sheets

File 200

Volume 202

Volume 204

Volume 206

SPARSE MULTI-COMPONENT FILES

BACKGROUND

This invention relates to the field of computer systems. More particularly, sparse multi-component files and methods for using such files are provided.

In some computer systems and/or networks, information may be striped across multiple devices to improve performance. Striping, as implemented in the RAID-0 storage scheme, involves storing "stripes" of information across multiple devices, rather than writing all the information to one device. Each stripe comprises a separate "chunk" of data written to each device in the stripe set (the set of devices participating in the striping scheme). Because the task of writing or reading the information is distributed among the multiple devices in parallel, the input/output throughput of the system can be improved.

Traditionally, striped information is processed at the storage block level. In particular, the information to be striped has no logical structure or meaning—it may comprise various unrelated parts of different files, volumes or other logical information constructs. Instead, the information is simply treated as a set of storage blocks to be distributed among the devices, and an algorithm is applied to determine how many blocks to include in each stripe, and which device each chunk of the stripe is to be stored on.

Whenever information needs to be retrieved from a striped storage system, all the devices must generally be accessed. Because the chunks written to one device have no meaning without the other chunks, typically one device cannot, by itself, satisfy a retrieval request (e.g., for a particular file); the chunks striped to a particular device are generally not identifiable or accessible directly through the device.

Also, in a striped storage system, the chunks written to a particular device are packed. That is, each chunk written to a particular device is stored contiguously to the chunks before and after it. This is done to conserve storage space on the device.

Further, in storage systems that employ block-level striping, a device that is a member of a striped configuration cannot easily be converted into a mirror, and vice versa. In a mirroring scheme (e.g., as implemented for RAID-1), all blocks written to a specified device are also written to another device, to provide redundancy. One is thus a "mirror" of the other.

To convert between block-level striping and mirroring, the entire original device or set of information must be re-read and either striped or mirrored, depending on the form of storage that is desired. The structure of the stripe set (or a mirror) must be completely reconfigured to change it to a mirror (or stripe set).

Thus, there is a need for a system and method for striping data across multiple devices in which logical sets of information (e.g., files) are readily identifiable or recognizable, and in which a stripe set can be readily converted to or from another form (e.g., a mirror).

SUMMARY

In one embodiment of the invention, a sparsely striped multi-component file is described. In this embodiment, a file (or possibly a segment of a file) is striped across multiple filers, file servers or other devices, to create a sparsely striped multi-component file. Each filer stores one sparse component, which contains the full logical structure of the file but physically comprises only the chunks allocated to that component. The other chunks are stored as holes. Thus, instead of contiguously packing each component's chunks at the block level, each component is a file having the same logical structure as the other components.

A component of a sparsely striped multi-component file can be easily converted to a mirror by filling in its holes. Similarly, a mirror can be easily converted to one component of a sparsely striped multi-component file by removing or ignoring its unallocated chunks. In either case, the layout or logical structure of the component does not need to be reconfigured.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, methods of using sparse multi-component files are provided. A sparse multi-component file may be defined as a file stored on or across multiple physical storage devices. More specifically, each component of a sparse multi-component file is a sparse file stored on a separate device (e.g., a filer, a file server, some other network storage device). Each sparse component contains one or more holes. A hole may be defined as a logical portion of a component for which there is no assigned physical storage.

In one implementation of this embodiment, an original sparse multi-component file may be striped across the multiple devices. In this implementation, each component may retain the full logical size of the original file, but may only physically include the chunks of data allocated to that component. On any given component, portions of the file that are allocated to other devices are represented as holes. If multiple consecutive chunks are stored on other devices, the consecutive chunks may be aggregated into a single hole.

Thus, if an original file is logically N bytes in size, and consumes M bytes in physical storage space (where $M \leq N$), and there are X devices participating in the striping, each component may logically also be N bytes in size, but will only consume approximately M/X bytes of physical space.

In another embodiment of the invention, a sparse multi-component file may be mirrored across multiple devices. In this embodiment, a mirror is a replica of a storage device, having the identical logical structure and contents. The mirror may be easily converted from or to a sparsely striped component. For example, one component of a striped sparse multi-component file may be converted into a mirror of the original file by filling in its holes.

Yet another embodiment of the invention may be implemented for file segments rather then entire files. In this embodiment, a file may comprise any number of segments, and each segment may be treated differently regarding its striping or replication (mirroring) parameters. For example, one segment of a file may be sparsely striped across two devices, while a second segment of the same file may be sparsely striped across three devices, while yet a third segment is mirrored across any number of devices.

Figure 1:
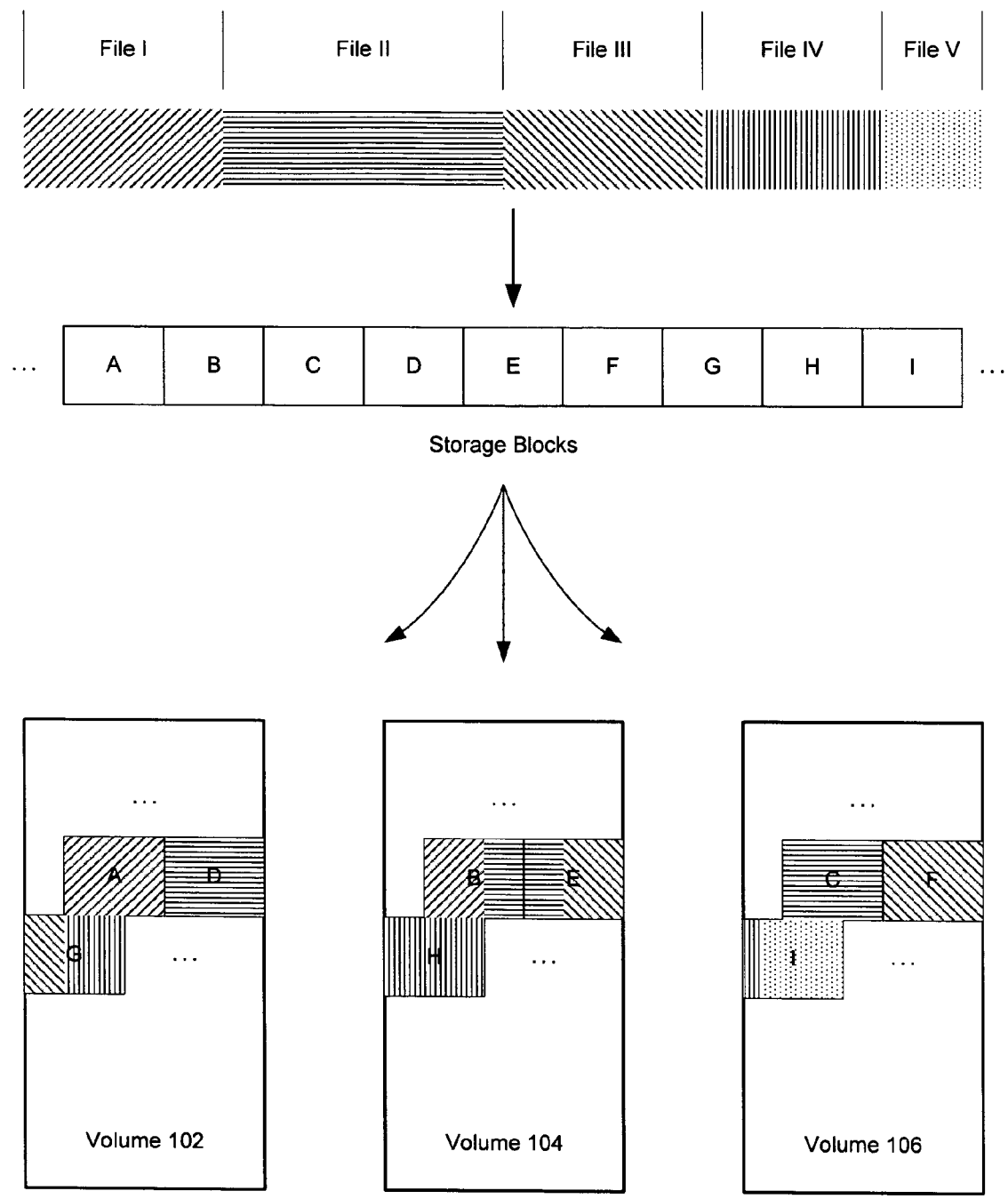
FIG. 1 is a block diagram depicting a traditional, block-based method of striping information across multiple volumes.

FIG. 1 depicts a traditional striping scheme, in which blocks of data are packed contiguously across three volumes. The chunk size (the amount of data written to each device for each stripe) is one block. The blocks of data include contents of various files (i.e., files I, II, III, IV and V). Each file is greater than one block in size.

In this scheme, files I, II, III, IV and V, each of which is greater than one block in size, are treated as a sequence of blocks, not files. Blocks A through I include various contents of the files, and are written to a striped disk drive or other storage device.

Block A is written to volume 102, block B is written to volume 104, block C is written to volume 106 and so on. In particular, blocks A, D and G are written contiguously to volume 102, blocks B, E and H are packed on volume 104 and blocks C, F and I are contiguously written to volume 106. It can therefore be seen that each file's logical structure is lost during the striping.

Because the blocks are written contiguously to each volume, in order to convert volumes 102, 104 and 106 from stripe sets into mirrors, all blocks must be read from each volume. Every block (A-I) must then be written to each volume, and the old stripes must be deleted or overwritten. Similarly, if three mirrored volumes were to be converted to the striping scheme of FIG. 1, blocks A-I would have to be read from a mirror and then striped as shown, again with each volume's stripes stored contiguously. Striping and mirroring configurations of the volumes are incompatible. The layout or structure for one must be eradicated in order to support the other.

In the block-based striping scheme of FIG. 1, an operator or administrator working locally at a volume would have a difficult time attempting to access a particular piece of information (e.g., file III) within blocks A-I. Each set of chunks/blocks written to a volume is treated as a raw set of blocks, and may be stored under various local file names that may or may not be decipherable. In other words, a "directory" command executed on one of the volumes in FIG. 1 would likely yield meaningless contents, and would certainly be of no help in locating a particular file included among blocks A-I.

Information stored in one volume's chunks generally cannot be accessed directly (i.e., without going through the application or file system software that performed the striping). Thus, each client or user accessing striped data in the system of FIG. 1 would have to know striping parameters such as stripe size, chunk size, number of volumes, etc.

Figure 2:
FIG. 2 is a block diagram depicting a method of sparsely striping a multi-component file, in accordance with an embodiment of the invention.
Figure 2:
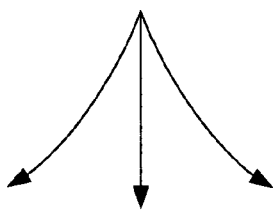
Figure 2:
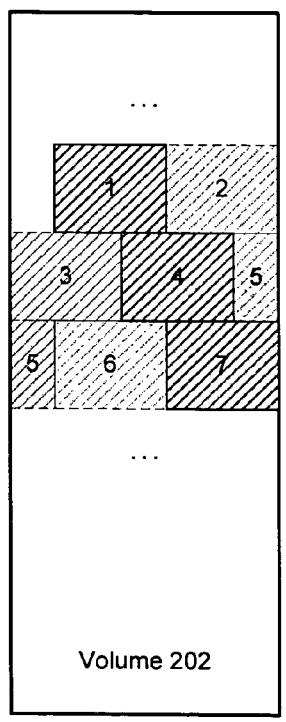
Figure 2:
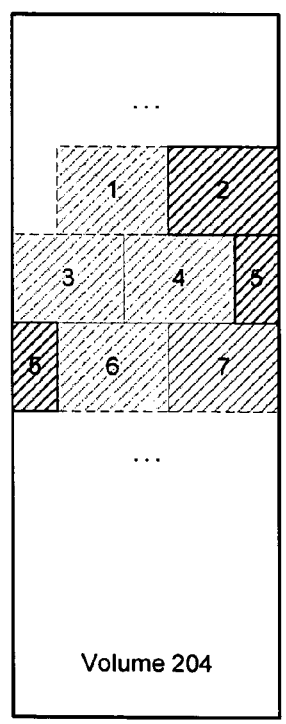
Figure 2:
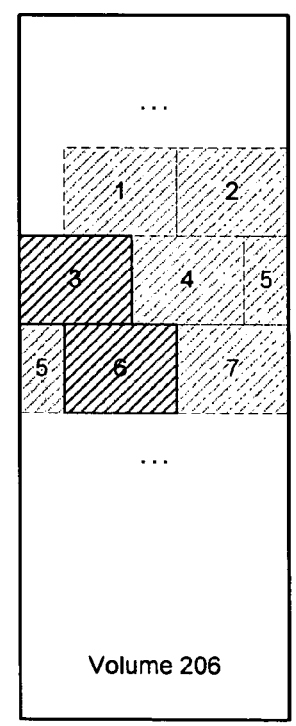

FIG. 2 depicts the file-based striping of a sparse multi-component file according to one embodiment of the invention. In FIG. 2, file 200 comprises a file stored on a file system that supports striping across multiple sparse components.

This embodiment is suited for implementation with the Solaris® operating system provided by Sun Microsystems, Inc. In this implementation, volumes 202, 204, 206 are separate filers, and are interconnected via dedicated or shared (e.g., network) links. Other embodiments and implementations of the invention may be readily derived for other operating systems, file systems, devices and communication topologies.

File 200 comprises logical portions 1–7, and has a logical size of N blocks. The chunk size for the striping scheme is one portion. The actual storage space required to physically store file 200 is M blocks, where $N \geq M$. Thus, file 200 may or may not be a holey file. Each portion may comprise any number of bytes or blocks, but each portion is of a substantially identical logical size, which may be represented as S.

Portions 1–7 of file 200 are sparsely striped across volumes 202, 204, 206, with each volume creating holes for the portions not allocated to it. Thus, volume 202 stores the contents of portions 1, 4 and 7, but leaves holes for the other portions. Similarly, volumes 204 and 206 store the physical contents only of their allocated portions, and leave holes corresponding to the other portions.

Holey portions of a volume in FIG. 2 are delineated by dashed lines, while allocated portions are delineated by solid lines. The holes have logical sizes, but consume no physical storage space, other than any pointers or indexes that may be required to identify them.

In one embodiment of the invention, each of volumes 202, 204, 206 is considered to store one sparse component of file 200. The three components will be approximately the same logical size, but may require varying physical storage amounts, depending on how much of each chunk is actually populated and how much is empty (i.e., holey). Each component may be stored under the same name (e.g., the name of file 200).

Because each component retains holes for its unallocated portions or chunks of file 200, those holes can be used to facilitate transition from a striping arrangement to mirroring. In particular, to make one or more of volumes 202, 204, 206 mirror file 200, the holes representing the volume's unallocated portions may be filled in using contents of portions allocated to the other volumes. The resulting mirror may be temporary (e.g., to act as a sort of cache) or may be permanent.

Similarly, to convert a mirrored volume into a sparse striped component, portions not allocated to the component may be deleted or moved, and replaced with holes. Either conversion, from sparse striping to mirroring or vice versa, may be made without having to completely remove or overwrite the existing format.

In the embodiment of the invention depicted in FIG. 2, when a request for data is received at one of multiple components, if that component does not store all the requested data (i.e., the requested data overlaps one or more holey chunks), that component (or the device hosting the component) may retrieve all or some of the requested data from a component that does have it.

Figure 3:
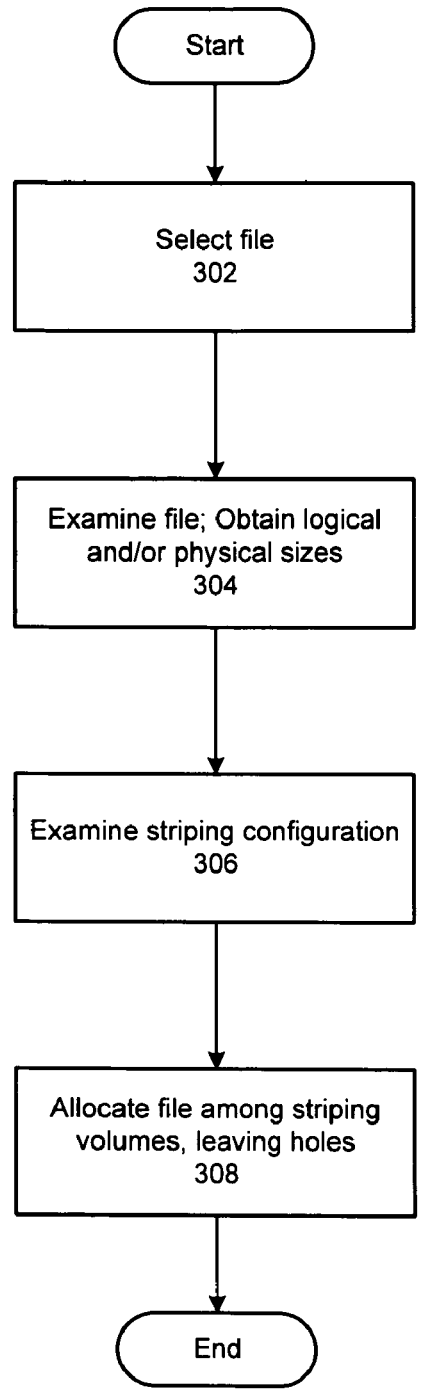
FIG. 3 is a flowchart demonstrating a method of sparsely striping a multi-component file, in accordance with an embodiment of the present invention.

FIG. 3 is a flowchart demonstrating a file-based method of striping a sparse multi-component file, according to one embodiment of the invention. In this embodiment, each component set of chunks is stored on a separate filer or file server within a network-based file system. In other embodiments, the components may be stored on separate logical or physical storage devices.

In operation 302, a file is selected for storage as a sparse multi-component file. The file may be selected as one of multiple selections. For example, an entire directory, device or file system may be selected for striping as sparse multi-component files. Or, the file may be a new file written to a logical storage structure whose contents are automatically stored as sparse multi-component files.

In operation 304, information regarding the selected file is examined. For example, its logical size (e.g., N bytes) and physical size (e.g., M bytes) may be noted.

In operation 306, information regarding the striping scheme is obtained. For example, the target devices, volumes or other storage structures that will host the multiple sparse components may be identified. Also, an algorithm for determining where to store each stripe or portion of the file may be identified.

In the illustrated embodiment of the invention, the selected file is to be sparsely striped across V volumes (V>1), with a chunk size of S (i.e., the size of a portion or chunk of the selected file). S may be expressed in bytes, storage blocks or some other unit. For a given portion, byte, block or other storage unit (represented here as B), the volume W to which that byte, block or other unit is to be allocated may be determined as follows:

$$W = (B \bmod S) \div V$$

In this embodiment, this equation is applied to the full logical size of the selected file (for each logical byte or block of the file), thereby taking into account any holes that may already exist in the file. In other embodiments of the invention, the equation may be applied only to physical bytes or blocks of the file.

In operation 308, each logical byte, block or other unit of the selected file is allocated and written to its corresponding filer. Illustratively, each filer's component set of chunks is stored under the same file name. In each filer's component, each byte, block or other unit is stored at the same logical offset that it had in the original file. Chunks of the selected file not allocated to a particular filer are represented as holes on that filer.

The illustrated method ends after the file is striped across multiple filers as multiple sparse components.

As described above, the unique form of a sparse multi-component file facilitates its conversion between different storage formats. In particular, a sparse multi-component file can be readily converted, in-place, between a single monolithic file, a striped sparse multi-component file and a mirrored multi-component file.

For example, to convert a sparsely striped multi-component file into a single file, the contents of each chunk are gathered from the devices to which they were allocated, and are merged into one file. Because they were sparsely striped, the merge operation can be executed as an efficient in-place copy, from other components into a selected component file, without altering the layout or structure of the destination component.

Figure 4:
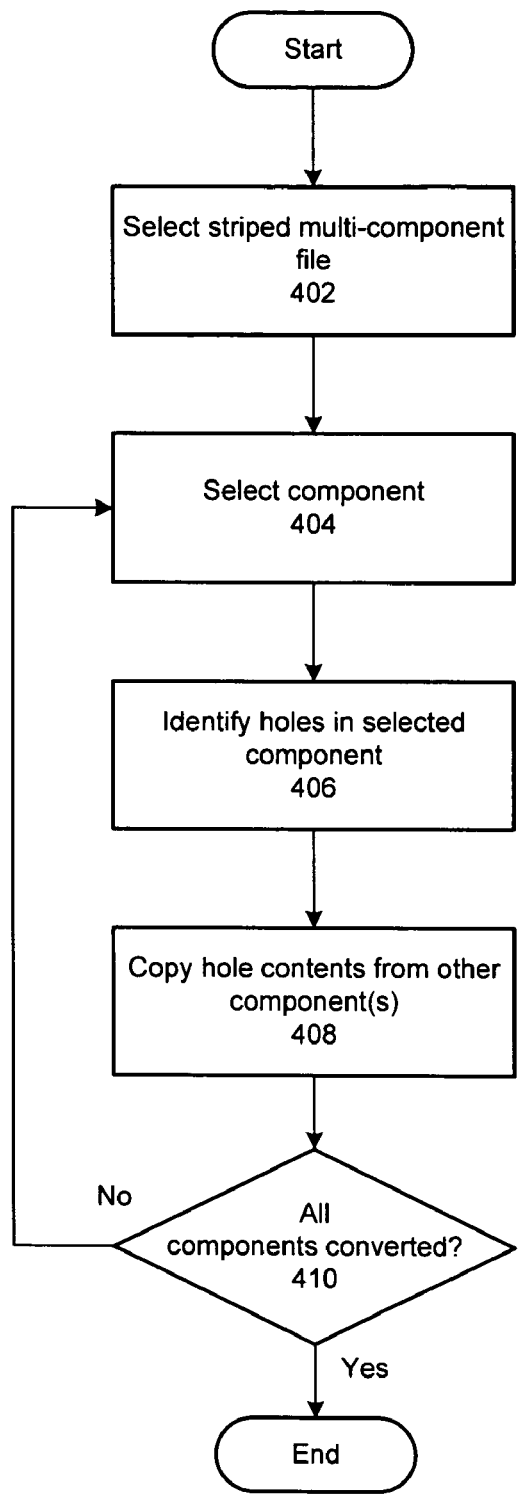
FIG. 4 is a flowchart demonstrating a method of converting a multi-component file into a mirror, in accordance with an embodiment of the present invention.

FIG. 4 depicts a method of converting a sparse multi-component file from a striped configuration to a mirror configuration, according to one embodiment of the invention. In this method, the structure of the striped components need not be altered.

In operation 402, a striped sparse multi-component file is selected. The file may be striped across number of components, on different filers, file servers or other devices.

In operation 404, one component of the sparsely striped multi-component file is selected.

In operation 406, holey chunks in the selected are identified. Each holey chunk is a chunk whose content was allocated to a different component. The number of holey chunks that exist in the selected component may depend upon factors such as the number of components, the size of the file, the chunk size, etc.

In operation 408, the contents of the sparse multi-component file that correspond to the holes are copied (e.g., from the other components). The copying of content may be performed by the file system, application or other software that created or maintained the sparse multi-component file.

Alternatively, each component may be accompanied by information (e.g., metadata) identifying the striping algorithm and the other components. This information may be used to allow the component (or the filer or other device on which the component is stored) to independently retrieve contents of its holes.

When a component retrieves content from another component, it may also send to that component the contents of its allocated chunks.

In operation 410, it is determined whether all components that are to be converted to mirrors have been converted. Some or all of the components of the sparse multi-component may be converted. After the last component is converted, the illustrated method ends.

In another embodiment of the invention, a mirrored set of file components may be converted to, or treated as, a sparsely striped set of components without changing their structure. Based on the applicable striping algorithm, each portion or chunk of the file is allocated to one filer, file server or other structure, and is unused (i.e., treated as a hole) on other filers.

In yet another embodiment of the invention, a multi-component file may be both mirrored and striped. In this embodiment, the components can be accessed in parallel (e.g., as in a striped arrangement). The host filers, file servers or other devices can then automatically propagate updates among themselves (e.g., as in a mirrored arrangement), either synchronously or asynchronously. As performance requirements change, the configuration may be altered accordingly (e.g., by changing the number of components, the chunk size, and so on).

In addition to facilitating a conversion from a striping scheme to a mirroring scheme, or vice versa, embodiments of the invention may be designed to convert from one striping scheme to another. For example, the number of devices or volumes in a strip set may be altered, a chunk size may be adjusted, etc. To implement a different striping scheme, a new striping algorithm $W' = (B' \bmod S') \div V'$ (instead of $W = (B \bmod S) \div V$) may be enforced by copying data between components to fill holes and removing data to create holes as necessary.

Based on the embodiments of the invention described herein, other embodiments may be configured to implement other data storage schemes, such as RAID-2, RAID-3, RAID-4, RAID-5, RAID-6 and combinations of any such schemes.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

For example, embodiments of the inventions described above may be readily implemented with RAID (Redundant Array of Independent Devices) technologies such as RAID 0 (mirroring), RAID 1 (striping) and RAID 10 (striping and mirroring). Other embodiments may be derived from these descriptions for other storage technologies, such as RAID 5 and RAID 6.

What is claimed is:

1. A method of sparsely striping a file across multiple components, the method comprising:
   selecting a file to be sparsely striped across multiple components;
   identifying a plurality of chunks in the selected file; and
   for each chunk:
      identifying a position of said chunk in the selected file;
      allocating said chunk to one of the multiple components;
      at said position in the one component, writing the content of said chunk; and
      creating a hole, corresponding to said chunk, at said position in each of the other components.

2. The method of claim 1, wherein each of the multiple components is a file having the same file name.

3. The method of claim 1, wherein each of the multiple components is stored on a separate file server.

4. The method of claim 1, wherein each said hole has a logical size but occupies no physical storage space.

5. The method of claim 1, further comprising:
   at a first component, merging holes corresponding to multiple consecutive chunks allocated to the other components into a single hole.

6. The method of claim 1, further comprising converting a first component to a mirror of the selected file by:
   copying the content of one or more chunks allocated to the other components; and
   replacing holes in the first component corresponding to the one or more chunks with the copied content.

7. The method of claim 6, further comprising:
   converting one or more of the other components to mirrors of the selected file;
   receiving an update to the selected file at a first mirror of the selected file; and
   asynchronously propagating said update to the other mirrors of the selected file.

8. The method of claim 1, further comprising converting the multiple components to a single file by:
   at a first component, for each hole corresponding to a chunk allocated to an other component:
      obtaining the content of the chunk; and
      overwriting the hole; and
   nullifying the other components.

9. The method of claim 1, further comprising:
   at a first component, receiving a read request for content of the file included in a first chunk allocated to an other component;
   retrieving said content from the other component; and
   in response to the read request, returning said content.

10. The method of claim 9, further comprising:
    at the first component, storing said content in a hole corresponding to the first chunk.

11. The method of claim 1, further comprising:
    at a first component, receiving a write request comprising content of a first chunk allocated to an other component; and
    forwarding said content to the other component.

12. The method of claim 11, further comprising:
    at the first component, storing said content in a hole corresponding to the first chunk.

13. A computer readable medium storing instructions that, when executed by a computer, cause the computer to perform a method of sparsely striping a file across multiple components, the method comprising:
    selecting a file to be sparsely striped across multiple components;
    identifying a plurality of chunks in the selected file; and
    for each chunk:
       identifying a position of said chunk in the selected file;
       allocating said chunk to one of the multiple components;
       at said position in the one component, writing the content of said chunk; and
       creating a hole, corresponding to said chunk, at said position in each of the other components.

14. A method of converting a sparsely striped multi-component file to a mirror, comprising:
    at each of one or more file storage devices, maintaining a component of a sparsely striped multi-component file, wherein each component is a sparse file;
    at a first file storage device comprising a first component, identifying holes in the first component, wherein each hole corresponds to a chunk of the sparsely striped multi-component file allocated to a component other than the first component; and
    for each hole:
       obtaining content of the sparsely striped multi-component file
    corresponding to said chunk; and
       replacing said hole with the content.

15. The method of claim 14, wherein said maintaining comprises:
    receiving an update to a first chunk of the sparsely striped multi-component file, wherein the first chunk is allocated to the first component;
    updating, at the first component, content of the first chunk; and
    updating, at one or more other components, holes corresponding to the first chunk.

16. A computer readable medium storing instructions that, when executed by a computer, cause the computer to perform a method of converting a sparsely striped multi-component file to a mirror, comprising:
    at each of one or more file storage devices, maintaining a component of a sparsely striped multi-component file, wherein each component is a sparse file;
    at a first file storage device comprising a first component, identifying holes in the first component, wherein each hole corresponds to a chunk of the sparsely striped multi-component file allocated to a component other than the first component; and for each hole:
obtaining content of the sparsely striped multi-component file corresponding to said chunk; and
replacing said hole with the content.

17. A network-based file storage system for storing a sparsely striped multi-component file, comprising:
multiple file storage devices, each file storage device comprising a component file configured to store one or more chunks of the sparsely striped multi-component file; and
in each file storage device's component file:
the contents of one or more chunks allocated to the file storage device; and
one or more holes corresponding to chunks allocated to other file storage devices;
wherein each file storage device's component file has a substantially similar logical layout.

18. The network-based file storage system of claim 17, wherein each of the multiple file storage devices is configurable to replace said one or more holes with contents of said chunks allocated to other file storage devices.

* * * * *

UNITED STATES PATENT AND TRADEMARK OFFICE
CERTIFICATE OF CORRECTION

PATENT NO. : 7,194,579 B2 Page 1 of 1
APPLICATION NO. : 10/831936
DATED : March 20, 2007
INVENTOR(S) : David Robinson et al.

It is certified that error appears in the above-identified patent and that said Letters Patent is hereby corrected as shown below:

Column 8, lines 44-46, replace

"   obtaining content of the sparsely striped multi-component file
corresponding to said chunk; and"

with

--   obtaining content of the sparsely striped multi-component file corresponding to said chunk; and--

Signed and Sealed this

Eighth Day of May, 2007

JON W. DUDAS
*Director of the United States Patent and Trademark Office*